Figure 5:
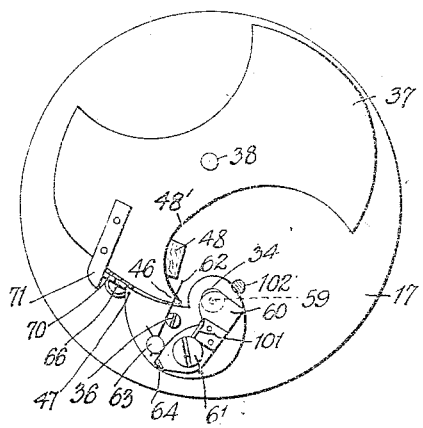

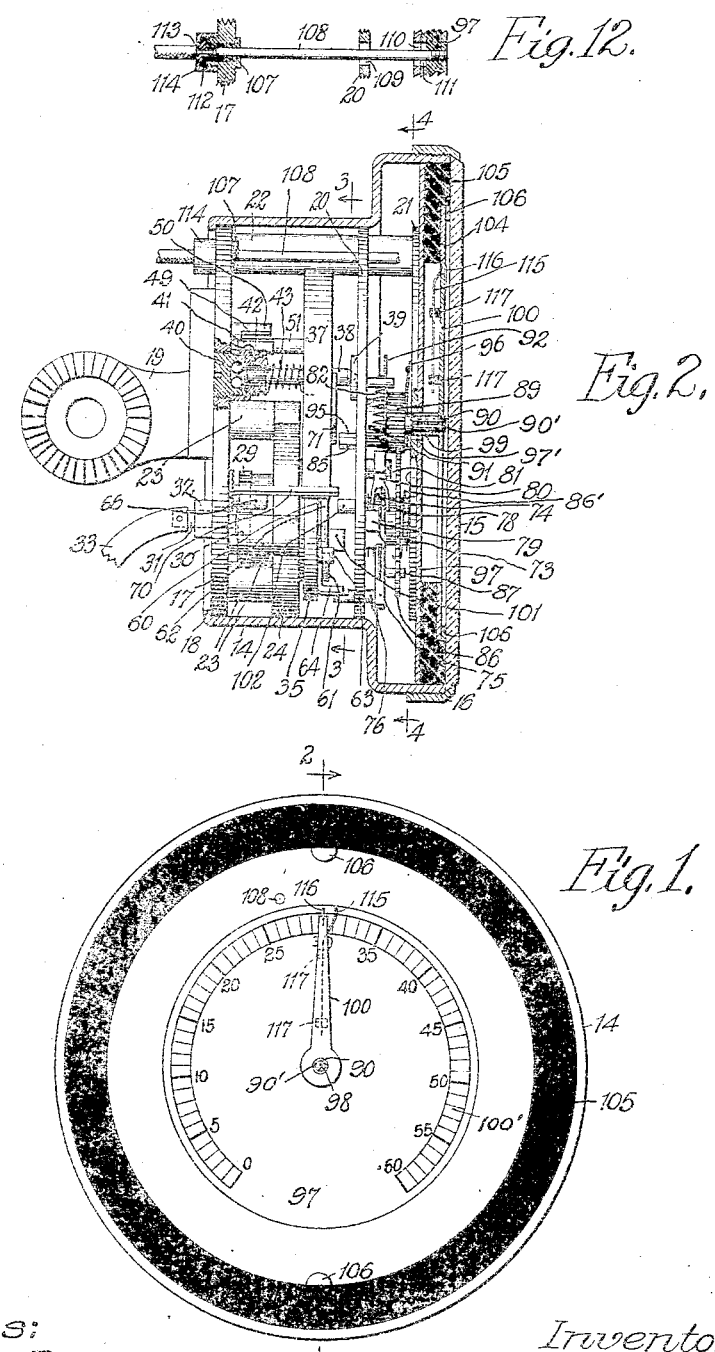

A. F. POOLE.
SPEEDOMETER.
APPLICATION FILED APR. 12, 1911.
1,110,143.
Patented Sept. 8, 1914.
3 SHEETS—SHEET 3.
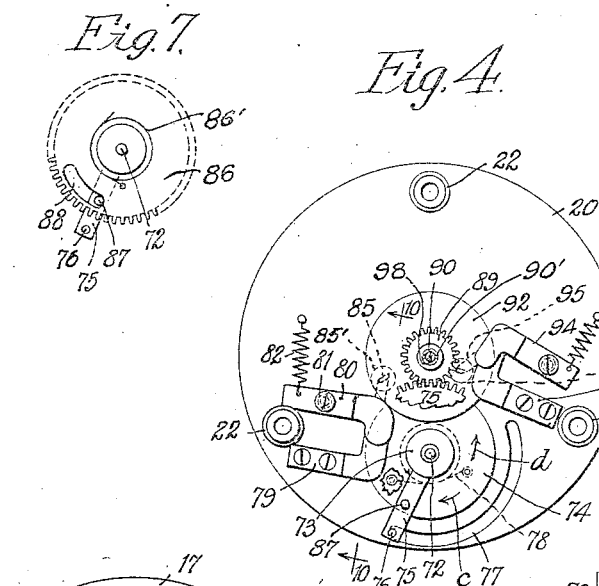
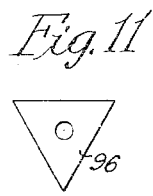
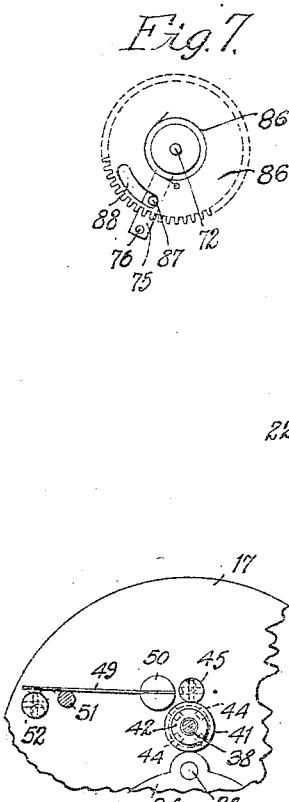
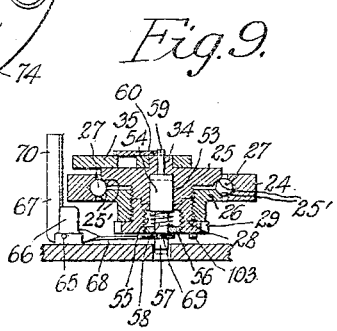
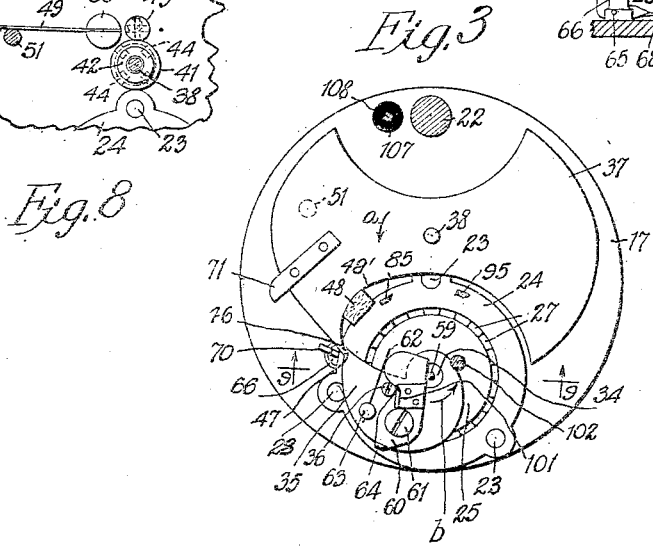
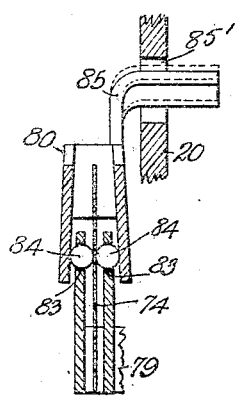
Witnesses:
Leonard W. Novander
Robert F. Bracke
Inventor
Arthur F. Poole
By Brown & Williams
Attorneys

A. F. POOLE.
SPEEDOMETER.
APPLICATION FILED APR. 12, 1911.

1,110,143.

Patented Sept. 8, 1914.
3 SHEETS—SHEET 2.

Witnesses:
Leonard W. Novander
Robert F. Bracke

Inventor
Arthur F. Poole
By Brown & Williams
Attorneys

UNITED STATES PATENT OFFICE.

ARTHUR F. POOLE, OF CHICAGO, ILLINOIS.

SPEEDOMETER.

1,110,143.    Specification of Letters Patent.    Patented Sept. 8, 1914.

Application filed April 12, 1911. Serial No. 620,524.

*To all whom it may concern:*

Be it known that I, ARTHUR F. POOLE, a citizen of the United States, residing at Chicago, in the county of Cook and State of Illinois, have invented a certain new and useful Improvement in Speedometers, of which the following is a full, clear, concise, and exact description, reference being had to the accompanying drawings, forming a part of this specification.

My invention relates to speed measuring devices, and particularly speedometers such as are employed on automobiles for the purpose of constantly indicating the speed at which the vehicle is running.

The device of my present invention operates upon the same basic principle as does the device which forms the subject matter of my copending application, Serial No. 515,016, filed August 28, 1909. This principle involves the combination of a constant time element and an element which is moved at a speed proportioned to the speed at which the vehicle is moving. Since the speed at which the vehicle moves is variable, the velocity of the latter element is correspondingly variable, and this element may, therefore, conveniently be termed the "variable element." It is possible to conceive of this variable element in various forms, for instance, a rotatable member, where the velocity would be angular. In the present state of the art, this type is so readily adaptable for the purpose set forth, that consideration of any other type is not necessary and I shall explain the generic theory of my invention briefly with reference thereto. Thus, the constant time element determines a definite period for a certain action of the variable element and it follows that the amount of this certain action will depend upon this period. If, then, the indicating means is subject to the amount of this certain action of the variable element, the speed of the variable element, and consequently of the vehicle to which it is operatively connected, will be measured. In other words, if $\theta$ equals the angle through which the variable member travels in a given time, $t$, and $\varphi$ equals the angular velocity of the element, then $$\theta = \varphi t$$

and, therefore, $\theta$ varies directly and proportionately as $\varphi$.

In the device which forms the subject matter of my copending application, the variable element is in the form of a rotating pointer which is associated with an annular scale. These parts are made of metal so that they may form the terminals of a spark gap between them, and means is provided for supplying a current of sufficiently high tension to jump this gap. The constant time element, in that device, determines the instants when the rush of current takes place and the parts are so adjusted that the spark always leaps the gap a certain predetermined time after the indicator, which is constantly rotating while the machine is running, was in alinement with the zero position. Thus, if the machine is running at a high rate of speed the variable indicator will travel a considerable distance before the spark appears and if the speed is cut down the spark will appear closer to the zero position—and the spot of light, produced by the spark, thus indicates the speed on the annular scale.

My present invention is concerned with the production of a device which involves the basic principle above set forth and in which the indicator hand or pointer is not constantly rotating—in other words, in which the hand or pointer itself, with the aid of the scale, indicates the speed. Thus, while some of the claims in my copending application referred to are of sufficiently broad scope to include the broad conception of my present invention, the electric spark was necessary in the specific device there involved. In the present case, the electric spark is not necessary, although I do propose means for employing it, as an accessory, to facilitate reading in the dark. The spark illuminates the scale very perceptibly.

The constant time element, in my present device as well as in my former one, is in the form of an oscillating member which moves in at least one direction for a given distance always in the same period of time—and I conveniently term this member the "flipper." In my former device the action of this flipper controlled the electric circuit but, as distinguished from this, the flipper in my present device controls the position of a dog which operates with the variable element, and the position of this dog determines the position of an intermediate setting piece. This intermediate setting piece is brought into a definite position depending upon the speed of the axle with which the meter is connected, once for every revolution of the primary shaft of the meter which is operated at a speed proportional to the speed of the axle. Clutch mechanism is provided which holds this intermediate setting piece in any position, this clutch mechanism being of such construction that the intermediate setting piece may be advanced but may not be set back except by a definite positive actuation by the dog referred to. Thus, if the speed is increased the dog will actuate merely to advance the intermediate setting piece slightly, whereas, if the speed is decreased, the clutch mechanism, when actuated, will release the intermediate setting piece, which then returns toward the zero position.

The indicating mechanism is operatively connected with the intermediate setting means and, since, as will be seen, the intermediate setting piece operates through an arc less than half a circle, these parts are connected together in such a manner that the indicating hand may operate through nearly a complete circle, thus providing for more ready and accurate reading of the scale. The indicating means is held in any set position by means of clutch mechanism similar to the clutch mechanism which has been described as associated with the intermediate setting means and, operating like that clutch mechanism, it permits the advance of the indicating hand but prevents its return except by means of a positive actuation by the dog.

The dog which has been referred to is pivotally mounted upon a cam which is secured upon the shaft and is thus operated at a speed proportional to the speed of the vehicle. This cam is so mechanically associated with the flipper that, once for each revoluton of the shaft, it "winds" the flipper mechanism, that is, it places the spring, which is connected with the flipper, under tension. Consistently, once for each revolution of the shaft, the flipper drops from the cam surface. This drop takes place during the constant period of time referred to and, at the end, the flipper engages means which normally retains the dog in one position, so as to release the dog and thus permit it to move into another position. The former position is the one in which the dog carries the intermediate setting piece with it. When the detent means is removed, the dog, moving to its other position, no longer carries the intermediate setting piece with it, and the latter is left in whatever position it has been placed. Passing the zone of the intermediate setting piece, the dog is automatically reset so that it may properly operate the clutch mechanisms which have been referred to and the intermediate setting means and the indicating means assume positions to designate the speed at which the shaft has been moving. Calibration is secured by adjusting the tension of the resilient agent by means of which the flipper moves.

As before stated, I provide a sparking circuit, as an auxiliary feature, which provides for reading the scale at night. In order to do this, I make the annular scale and the indicating hand of metal and the space between them constitutes the spark gap. Furthermore, so that a very bright spark may be secured, I provide a novel sparking circuit, involving an entirely new arrangement of condensing elements, and by means of this circuit I secure the desired results.

Figure 6:
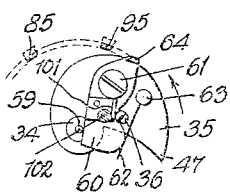
Figure 13:
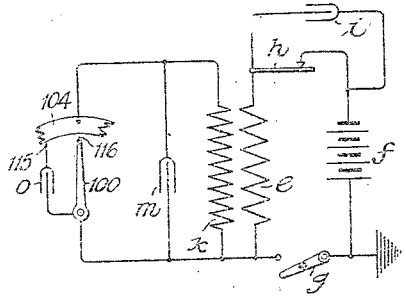

My invention is embodied in the device illustrated in the accompanying drawings in which Figure 1 is a face view thereof; Fig. 2 is an elevational view of the interior mechanism, the casing and some of the parts contained thereby being shown in section taken on the plane of the line 2—2 of Fig. 1 and looking in the direction indicated by the arrows; Fig. 3 is a view on a plane parallel to that of Fig. 1, being practically the plane of the line 3—3 of Fig. 2, and looking in the direction indicated by the arrows; Fig. 4 is another view on a plane parallel to that of Fig. 1, being substantially the plane of the line 4—4 of Fig. 2, and looking in the direction indicated by the arrows; Fig. 5 is a view similar to Fig. 3, some of the parts being removed, however, and the flipper being shown in position just after having dropped from the cam surface. Fig. 6 is a view similar to Fig. 3, showing several parts isolated from the others and illustrating the cam in another position. Fig. 7 is an isolated view showing the parts for connecting the intermediate setting piece and the indicator mechanism. Fig. 8 is a fragmentary view of the back plate of the device, showing some of the parts carried thereby. Fig. 9 is a diametrical sectional view of the bearing on which the cam is mounted, being taken approximately on the plane of the line 9—9 of Fig. 3 and looking in the direction indicated by the arrows. Fig. 10 is an enlarged view of the clutch mechanism, being a sectional view taken approximately on the plane of the line 10—10 of Fig. 4 and looking in the direction indicated by the arrows. Fig. 11 is a face view of a spring plate which is employed to keep some of the parts in proper position. Fig. 12 is a sectional view showing the parts for conducting the current from the external circuit to the dial plate. Fig. 13 is a diagrammatic view of the circuit which I employ.

Like reference characters are applied to the same parts throughout the various figures.

The entire mechanism of my device is disposed within a small circular casing which comprises a stepped annulus 14, a glass front or cover 15, which is held upon the annulus by means of a clamping ring 16, and a back plate 17 which is similarly held against an inturned flange 18 on the annulus in a manner to be described later. The back plate 17 has a bracket 19 secured thereto and this bracket provides for the mounting of the device in an automobile or other vehicle. The supporting framework, which fits snugly in the annulus, comprises the back plate 17, the intermediate plate 20, and the front plate 21, these three plates being held together in parallel relation to each other and spaced from each other by means of the pillars 22, 22. Mounted upon three posts 23, 23, which extend forwardly from the back plate 17, is an annular bearing 24 which is best illustrated in Figs. 8 and 9. Two collars 25 and 26, screw-threaded together and having their adjacent peripheral edges chamfered so as to form a V-shaped peripheral groove 25", are disposed within the annular bearing 24, and this V-shaped groove, coöperating with the V-shaped groove 25' on the inner circumference of the annular bearing, forms a race for the balls 27, 27. This arrangement provides a considerable engaging area for the primary rotating member and easy running and durability is thus assured. Screwed into the collar 26, preferably tightly up against the collar 25 so as to form a locked arrangement, is a sleeve 28 which carries a spur gear 29, and this spur gear meshes with a pinion 30 mounted upon a stub shaft 31 set in a bearing 32 and connected by means of a flexible shaft 33 with the front axle of the vehicle in which the device is mounted. It will thus be seen that the primary rotary element is operatively connected with the front axle of the automobile.

The collar 26, on its forward side, is provided with a boss 34 upon which a cam 35 is mounted, this cam being securely fastened to the collar 26 by means of a screw 36. This cam 35 is somewhat similar to an involute cam in that it provides for a gradual and steady rise and a sudden drop once for every revolution of the rotary shaft or element comprising the collars 25 and 26. Associated with this cam is the flipper 37 which, broadly, is in the form of a comparatively heavy butterfly disk or plate oscillating upon a spindle 38 which is set in a bearing 39 at its forward end and in a bearing 40 at its other end, the former bearing being carried by the intermediate supporting plate 20 and the latter being carried by the back plate 17. The bearing 40 is surrounded by a collar 41, which extends over the front thereof so as to retain the balls in place and which is supplemented by a sleeve 42 surrounding the spindle. A helical spring 43 surrounds the spindle 38 between the flipper and the bearing 40 and one end of this spring is connected with the flipper while the other end thereof is connected with the sleeve referred to. This spring has a tendency to turn the flipper in the direction of the arrow a of Fig. 8 and its tension can be adjusted, to secure calibration, by turning the collar 41 which is provided with the peripheral sockets 44, 44 for the reception of a key operating in the manner of a capstan bar. This collar may be locked in any adjusted position by means of an eccentric 45 mounted on the back plate, all as clearly illustrated in Figs. 2 and 8. The cam 35 and the flipper 37 are disposed in the same plane so that the corner 46 of the flipper may ride upon the cam as a follower, as illustrated in Fig. 8, the tension of the spring tending to hold this corner constantly upon the cam surface. As the cam rotates in the direction of the arrow b of Fig. 8, the flipper will first be oscillated in a clockwise direction against the tension of the spring 43 until the outer end 47 of the cam surface is reached—and then the flipper will suddenly move in a counterclockwise direction under the influence of the spring. In order that the cam surface may be kept lubricated a block 48 of leather or similar material is secured in the concave portion 46' of the flipper near the cam and is soaked in oil, the passing cam surface rubbing against this block before it approaches the corner 46. While the spring 43 may be sufficient to secure proper operation, I find it desirable to employ an auxiliary spring, stronger than the spring 43, which acts on the flipper only when it is near and at the limit of its clockwise movement. This auxiliary spring is in the form of a leaf spring 49 and, as best shown in Figs. 2 and 8, it is mounted upon a post 50 extending forwardly from the back plate 17. A pin 51 extending rearwardly from the flipper 37 engages this spring as the flipper approaches the limit of its clockwise movement. The spring is prevented from having effect at any other time by means of a stud 52 which is eccentrically mounted in the back plate 17. The spring 49 is adapted to engage the stud 52 when it, itself, is not engaged by the pin 51 on the flipper. Since the stud 52 is eccentrically mounted, it may be turned to adjust the range of the action of the spring and in this way, further, calibration may be effected. Thus, as the corner 46 of the flipper rides upon the cam surface, the tension of the spring 43 will gradually be increased and, as the corner 46 nears the end 47 of the cam surface, the pin 51 on the flipper engages the spring 49 to then place the flipper under a much greater tension, and in this way overriding is prevented and the immediate and accurate drop of the flipper from the cam surface is assured. The spring 49 gives the flipper an initial impulse and the latter is then carried the remainder of its counterclockwise travel under the influence of the spring 43.

As best shown in Fig. 9 the joined collar 25 and sleeve 28 are provided with the axial bore 53 in which a plunger 54 is disposed. The sleeve 28 has a pocket 55, which is closed by means of a plug 56 in which the downward extension 57 of the plunger is guided. A helical spring 58 surrounds this extension in the pocket and tends to maintain the plunger at the upward limit of its movement. The plunger is also provided with an upward extension 59 which protrudes beyond the plane of the cam 35 and thus forms a detent member for the dog 60 which is pivotally secured at 61 to the cam. On one side, this dog is adapted to engage the head of the screw 36 and when the dog is in this position the detent 59 engages the other side thereof to hold it in positive relation to the cam. A leaf spring 62, mounted upon a post 63 on the cam, bears against the dog and tends to throw it away from the head of the screw. As is evident, this tendency is normally blocked by the detent but it will appear that when the detent is drawn downwardly into the bore the spring will be free to act and the dog will be moved in a clockwise direction (Fig. 3). The dog 60, as best shown in Figs. 2 and 3, is provided with the forward extension 64 which, as will be described, is arranged to engage the intermediate setting piece and parts of the clutch mechanisms in order to open them.

Pivotally mounted at 65 in a bearing 66 on the back plate 17, is a bell crank lever 67 which, as shown in Fig. 2, extends forwardly into the plane of the flipper and downwardly to the extension 57 on the plunger 54. In Fig. 9, where this arrangement is shown upright, the arm 68 of the bell crank lever is bifurcated at its end so that it may engage in a peripheral groove 69 in the extension 57. The other arm 70, which extends to the plane of the flipper, is arranged to be engaged by a lug 71 which is secured in proper position upon the flipper and this engagement is such as to turn the bell crank lever to draw the detent 59 into the bore and to thus release the dog 60 so that it may act under the influence of the spring 62. The position of the lug 71 on the flipper is important and is determined so that at the time that the corner 46 of the flipper is at the end 47 of the cam surface the lug will be a definite distance from the position it must assume to bring the detent 59 into the bore to release the dog—and this definite distance, under the influence of the resilient means connected with the flipper, is always traversed in the same predetermined period of time.

The mechanism which has been described is mounted between the back plate 17 and the intermediate supporting plate 20. Mounted between the intermediate supporting plate 20 and the front plate 21, preferably in axial alinement with the collar 25, is a shaft 72 upon which is securely mounted a hub 73 carrying with it a clutch disk 74 and a radially extending arm 75 which forms the intermediate setting piece hereinbefore referred to. The piece 75 is provided with a pin 76 which extends through a slot 77 in the plate 20, this slot being concentric with the shaft 72, and into the path of the forward extension 64 on the dog 60. A spring 78, connected between the disk 74 and the plate 20, tends to hold the piece 75 at the limit of its clockwise movement (Fig. 4). The extension 64 on the dog is arranged to engage the pin 76, as illustrated in Fig. 2, when the dog is in its active position, that is the position in which it is locked rigidly to the cam. It will now appear that as the dog rotates with the cam, the extension 64 will engage the pin 76 and will carry the setting piece 75 around with it until the detent 59 has been drawn into the bore, by means of the engagement between the lug 71 on the flipper and the bell crank lever, and then the dog will move to its passive position and will leave the intermediate setting piece in whatever position it has carried it to. The parts are so arranged that, if the intermediate setting piece is at the limit of its clockwise movement, the extension 64 will engage the pin 76 just at the time that the corner 46 of the flipper is released from the end 47 of the cam surface. As will more fully appear hereinafter, however, it is possible, particularly at high speeds, that the intermediate setting piece does not have the opportunity to reach the limit of its clockwise movement before the dog again comes around to engage it—but this is a matter of indifference so far as the operation is concerned.

The clutch mechanism, with which the clutch disk 74 coöperates, is best illustrated in Figs. 4 and 10. The clutch comprises a stationary fork 79 secured to the plate 20 in any suitable manner and a fork 80, which is adapted to engage over the first fork, and which is pivoted at 81 to the plate, the forks being held in engagement by means of a spring 82 connected between the tail of the pivoted fork and the plate. The forks are adapted to embrace the clutch disk 74 as illustrated in Fig. 10, and the stationary or inner fork is provided at its end with openings 83, 83 for the reception of clutch balls 84, 84 which are held in place by means of the tangs of the pivoted fork. The tangs of the pivoted fork converge so that as they approach the tangs of the stationary fork they will tend to jam the balls in place and, if the disk passes between the balls, they will tend to hold the disk in place. The mechanical lines of the balls which pass through the contact points between the balls, the disks and the arms of the pivoted fork, do not all pass through the contact points between the balls, and it will appear that the arrangement will positively arrest any movement of the disk 74 in the direction of the arrow a (Fig. 4). However, this very arrangement will automatically permit movement of the disk 74 in the direction of the arrow b. However, I provide means for positively breaking the clutch at the proper time to permit movement of the disk 74 in the direction of the arrow a. This is accomplished by means of the extension 64 on one arm 66 of the pivoted fork 50, this extension passing through an ample opening 65' in the plate 20 into the path of the extension 64 on the dog 60. As will later appear, when the extension 64 strikes the extension 65, the fork 50 will be swung about its pivot against the tension of the spring 52, to remove the pressure on the balls and so release the disk 74 so that it may return to the limit of its clockwise movement under the tension of the spring 73.

Mounted loosely upon the shaft 72 is a gear 85, this gear being mounted independently of the intermediate setting piece except as will be presently pointed out. The piece 75 is provided with a forwardly extending pin 87 which extends into a slot 83 in the gear, this slot being concentric with the shaft 72. A spring 89 serves to keep the parts in the relation shown in Fig. 7. This arrangement provides for carrying the gear with the setting piece although it does not connect them for such operation constantly. The gear 86 meshes with a pinion 88 securely mounted upon a shaft 90 which is journaled in a bearing 91 on the intermediate plate 20 and which extends forwardly through the front plate 21, as will be described. Carried with the pinion 88 is a friction disk 92, similar to the friction disk 74, which coöperates with the clutch members 93 and 94 which are exactly the same in construction and operation as the clutch members 79 and 80. The movable fork 84 carries the rearward extension 95 which passes through an ample opening 95' in the plate 20 and into the path of the extension 64 on the dog 60. As the intermediate setting piece is moved forwardly, the gear 86 is rotated and this rotation is transmitted to the pinion 88. In this way the shaft 90 is rotated and may be advanced to any position until it is positively released, as will be described. A small triangular spring piece 96 surrounds the shaft 90 and, engaging the rear side of the front plate 21, maintains the pinion 88 and the associated parts in proper position and prevents improper operation by jar or impacts.

A dial plate 97 is disposed against the front of the front plate 21 and is similarly provided with an opening 97' through which the shaft 90 may extend. The forward end of the shaft 90 is split, as illustrated at 90', and has a tapered bore for the reception of the tapered screw plug 98. A sleeve 99 fits over the end of the shaft 90, as illustrated in Fig. 2, and when the plug 98 is inserted, the split end is spread to secure the sleeve in position. This sleeve carries the indicating hand or pointer 100 and the end of this pointer passes over the circular scale 100' on the dial plate 97.

It will now appear, from Figs. 2, 3, 4 and 6, that, when the dog 60 is in its active position, the extension 64 thereon will engage the pin 76 on the intermediate setting piece, the extension 85 from the clutch for the intermediate mechanism, and the extension 95 for the clutch of the indicating mechanism. It will be remembered that the engagement between the lug 71 on the flipper and the arm 70 of the bell crank lever 67 secures the release of the dog and permits its change to its passive position. The place of this release depends upon the speed of the primary rotary element and it will thus appear that, once for every revolution of the rotary element, the intermediate setting piece is brought into a position determined by the release of the dog to its passive position. Just after leaving the pin 76 of the intermediate setting piece, the dog 60 is in its passive position and, since it must be in its active position for the engagements with the parts 95 and 85, which follow, it is necessary that means be provided for resetting the dog into its locked position before the extension 64 reaches the member 95. I provide such an arrangement in the lug 101 on the dog, which lug is adapted to engage a pin 102 extending rearwardly from the intermediate plate 20. This is a wiping engagement and is sufficient to move the dog over into a position in which it engages the head of the screw 36. It will be understood that the engagement between the lug 71 on the flipper and the bell crank lever is but momentary and is sufficient merely to draw down the detent 59 for an instant, upon which action the dog may swing over under the influence of the spring 62 into position over the detent to hold it in the bore. It will be evident then that, once being brought down into the bore so as to permit the dog to move over it, the plunger and the detent carried thereby are free to operate under the tension of the spring 58 except for the engagement between the detent and the under face of the dog. Then, when the wiping engagement between the lug 101 and the pin 102 takes place, the dog is moved away from the detent and the latter may rise to hold the dog in place.

While I have introduced explanations of the individual operations of the various parts throughout the structural descriptions, I think it advisable to append a brief explanation of the operation of the device as a whole. This is as follows: The collar 25 is operated at a speed proportional to the speed of the vehicle to which the meter of my invention is applied. This collar rotates constantly during the running of the automobile or other vehicle and the cam 35 is thus being rotated constantly. During the main part of this rotation the dog 60 is locked to the cam. As rotation proceeds, the cam 35, operating in the direction of the arrow $b$, moves the flipper in a clockwise direction and, during such operation, the extension 64 on the dog carries the intermediate setting piece with it unless the latter is already disposed in an advanced position. When the corner of the flipper reaches the end of the cam surface, the flipper is free to act under the influence of the resilient means connected therewith and it oscillates anti-clockwise so that the lug 71 thereon comes into engagement with the bell crank lever. To release the dog and to prevent its affecting the intermediate setting piece any further if it has affected it at all, the length of time between the instant that the flipper drops and the instant that the dog is released is carefully calibrated and is always the same. If the rotary element is running at a high rate of speed the dog will carry the intermediate setting piece farther than if it is rotating at a low rate of speed. After having brought the intermediate setting piece to a definite position, determined by the release of the dog and its change to its passive position, the dog is restored to its active position. As the intermediate setting piece swings over in a counterclockwise direction, the pin 87 carried thereby rotates the gear 86 owing to the engagement of the pin 87 in the slot 88 as shown in Fig. 7 and in this way the hand is moved in a clockwise direction through the gears 75 and 89, these movements being permitted by the clutches as heretofore described. The dog, thus in its active position, approaches the piece 95 and, engaging it, opens the clutch. However, considering the machine as just started, the gear 86 is in engagement with the pin 87 in the relation shown in Fig. 7 and nothing will occur because the clutch members 79 and 80 hold the intermediate setting piece thus preventing movement of the gears. As the dog proceeds in its rotation it engages the piece 85 and the momentary opening of the clutch of the intermediate mechanism will permit the intermediate setting piece to drop back under the action of the spring 78 toward the limit of its clockwise movement carrying the pin toward the other end of the slot 88 because the gear 86 is held by the other clutch. It will be remembered that the opening of the clutch of the indicating mechanism was merely momentary and that the indicating mechanism is again locked in position by the time that the dog reaches the piece 85; therefore, the release of the intermediate mechanism does not affect the indicating mechanism at this time. As the dog proceeds in its rotation, however, it again picks up the intermediate setting piece and again carries it to a position dependent upon the speed, but no forward movement of the gear 86 will occur until the pin 87 reaches the right-hand end of the slot 88. It is possible, as hereinbefore pointed out, that the dog will catch the intermediate setting piece before the latter is returned to the limit of its clockwise movement. Therefore, particularly on high speeds, the intermediate setting piece will flutter more or less but this is of no consequence since the limit of its counterclockwise movement is the important consideration. The slot 88 in the gear 86 is sufficient to permit this fluttering of the intermediate setting piece without moving the gear.

If the speed increases the intermediate setting piece is carried around a little farther each time and the indicating means is advanced merely by its being shoved ahead correspondingly, since the clutch mechanism associated therewith permits it. If, however, the speed decreases the operation is as follows: It will be noted that once for every revolution of the rotating element the dog opens the clutch associated with the intermediate mechanism so that, if necessary, the intermediate setting piece may drop back under the action of the spring 78 to the tardy dog, the delayed approach of which is due to the decrease in speed. The dog having determined the position of the intermediate setting piece nearer toward the limit of its clockwise movement, it proceeds to release the clutch of the indicating mechanism so that that mechanism may drop back under the action of the spring 86' which rotates the gear 86 in a clockwise direction to correspond with the new position of the intermediate setting piece, this being determined by the engagement between the right-hand end of the slot 88 in the gear 86 and the pin 78. Summarizing, the first engagement of the dog sets the intermediate setting piece, and rotates the gears 75 and 89 since the relation of the parts is as shown in Fig. 7 the second engagement permits the setting of the indicating mechanism relative to the intermediate piece, and the third engagement releases the intermediate piece for its next setting—the next setting then takes place, and the indicating mechanism is then adjusted to the new setting, and so on. In this way the indicating mechanism indicates the speed at which the vehicle has been moving for the last few feet, say sixteen, depending upon the gear relation. The calibration is such that the pointer 100 indicates the number of miles per hour on the dial. The feature of successively indicating the speed of these predetermined short blocks has unique utility in that if the automobile or other vehicle should accidentally strike an obstacle, the meter will indicate the speed at which the vehicle was moving when it struck it.

As a matter of precaution, if the flipper should fail to unlock the dog or if the vehicle should be running at a speed beyond the range of the meter, I provide safety independent means for releasing the flipper. This means is in the form of a pin 103 extending from the face of the sleeve 28. It will appear from Fig. 3 that this pin passes by the arm 65 of the bell crank lever 67 once for every revolution of the rotary element. Under ordinary circumstances the pin has no effect since during that part of the revolution that it passes the arm 63, the latter, being brought down by the flipper, is held down by reason of the engagement between the plunger and the under side of the dog. If it should occur, however, that the arm was not down the pin would move it down so as to release the dog and in this way there is no possibility of the parts being locked together for an undue length of time. The pin is so positioned on the rotary element that it crosses the zone of the arm at about the time that the indicator hand would be at "60" if it were locked to the rotary element through the medium of the dog.

In order that the instrument may be readily read at night I provide an accessory arrangement in the form of an electric circuit which includes the indicator hand as one terminal of a spark gap and a metallic ring 104, within which the indicator hand operates, as the other terminal of the spark gap. This ring 104 rests upon an insulating annulus 105 which fits snugly within the enlarged front part of the annulus 14 and surrounds the dial plate. The various parts which have been described are disposed in the casing, with the back plate 17 up against the inturned flange 18, and after the dial plate 97 has been placed in position, the insulating annulus is disposed in place. Then the metal ring 104 is disposed on the step on the insulating annulus, as illustrated in Fig. 2, and the glass cover is applied. When the clamping ring 16 is screwed onto the annulus 14, all the parts will be firmly mounted in place, the ring 104 either being close to the glass cover or being positively separated therefrom by small lugs 106, 106 as illustrated in Fig. 2. The indicator hand is grounded to the device as a whole and means must therefore be provided for properly isolating the other terminal of the circuit which enters for connection with the ring 104. This arrangement is best shown in Fig. 12. The back plate 17 is provided with an opening in which an insulating spool 107 is disposed and a rod 108, passing into this spool, extends forwardly through an opening 109 in the plate 20 and through openings 110 and 111 in the plates 21 and 97, respectively. The rod then passes through the insulating annulus and is screwed into the metallic ring 104. The spool 107, on the rear side of the plate 17 is supplemented by a bushing 112 in which the conductor lead 113 is disposed, the end of this lead being riveted over and being arranged for connection with the rod 108 when the bushing is attached to the spool and is held in contact therewith by means of the flanged collar 114, all as clearly shown in the figures just referred to.

The circuit arrangement is shown in Fig. 13. The primary winding of an induction coil is shown as e, this winding being connected with a source of current f through a switch g and a trembler h, this trembler being operated in any suitable manner, for instance by means of the core of the induction winding. A condenser i is connected in bridge with the trembler contacts to eliminate sparking. The secondary winding is illustrated at k and a static condenser n is connected in shunt with this winding. The metallic ring 104 is connected to one terminal of the secondary winding while the indicator hand 100 is connected to the other terminal of this winding. In order to facilitate the leap of the spark across the gap between the indicator hand and the ring, I provide means for preliminarily ionizing the atmosphere at the gap, and this is particularly valuable in view of the fact that the ring is likely to oxidize, under which conditions it might otherwise be necessary to increase the battery. This ionizing means is in the form of an auxiliary contact point which is associated with the ring to form an auxiliary spark gap in shunt of the main spark gap, this auxiliary spark gap circuit being provided with a small condenser o. In practice I find that the effect of this condenser may be secured by means of a small wire mounted upon and close to the hand but insulated therefrom, as illustrated in Figs. 1 and 2, the end of this wire being turned over as illustrated at 115 to form the auxiliary contact point. The indicator hand itself is provided with a contact point 116.

When the primary circuit is interrupted by the trembler contacts, the voltage in the secondary circuit builds up at the terminals of the spark gap 104, 116. The auxiliary terminal 115, however, is brought very close to the ring with the result that a tiny spark will jump from the terminal 115 to the ring before the voltage has reached a point at which the current will jump from the point 116. The amount of electricity which can pass from the point 115 to the ring, however, is very small on account of the very small capacity of the condenser o. The result, therefore, is that the tiny spark which passes in this preliminary way ionizes the air between the main contacts, and when this has been accomplished the spark will jump across the contacts 116, 104, at a very much lower voltage or a considerably greater spark will be produced with the same voltage. The condensing element o is spaced from the hand by means of rubber studs 117, 117 and it is important that the wire is not connected with the hand at any point or with any other part of the circuit. The gap between the hand and the wire must be greater than the gap between the point 116 and the ring, for, otherwise, the spark would jump from the hand to the auxiliary wire and from the terminal of the wire to the ring.

The purpose of the condenser m is ultimately to cause the main spark to be more visible to the eye than would otherwise be the case. It gives to the spark the character of the spark from a Leyden jar as distinguished from the spark which is given from the terminals of the secondary of an ordinary induction coil. The high tension current discharged from the secondary winding is in part absorbed by the condenser which then gives out its charge as the spark passes between the terminals of the spark gap. The result is that the current passes for a longer time between the terminals of the gap than would otherwise be the case and it also passes at a lower voltage. A comparatively red spark is secured in this way and this kind of spark is considerably more visible than the blue or violet spark of the induction coil not so connected. It will appear that one can become accustomed to the scale and can determine the indication entirely independent of the figures on the dial plate. However, the spark illuminates the dial plate to such an extent that the figures can readily be seen at night and I find it advisable therefore to place the scale under the circular zone in which sparking takes place.

I claim as new and desire to secure by Letters Patent:

1. In a speedometer, in combination, a revolving cam, means for revolving said cam, a movable dog carried by said cam and having an active and an inactive position, a time element for moving said dog from its active to its inactive position, and setting means advanced by said dog when it is in its active position.

2. In a speedometer, in combination, a revolving cam, means for revolving said cam, a movable dog carried by said cam and having an active and inactive position, a time element controlling the position of said dog, means for moving said dog to its inactive position, setting means advanced by said dog in its active position, and setting means for said dog.

3. In a speedometer, in combination, a revolving cam, means for revolving said cam, a movable dog carried by said cam and having an active and an inactive position, a time element controlling the position of said dog, setting means advanced by said dog in its active position, a one-way clutch for said setting means, and indicating means, the position of which is determined by said setting means, said setting means and indicating means being connected.

4. In a speedometer, in combination, a revolving cam, means for revolving said cam, a movable dog carried by said cam and having an active and an inactive position, a time element controlling the position of said dog, setting means moved by said dog when in its active position once in every revolution thereof, a clutch for holding said setting means in position, said dog releasing said clutch during each revolution, and indicating means, the position of which is determined by said setting means.

5. In a speedometer, in combination, a revolving cam, means for revolving said cam, a movable dog carried by said cam and having an active and an inactive position, a time element controlling the position of said dog, setting means moved by said dog when in its active position once every revolution thereof, a clutch for holding said setting means in position, said dog releasing said clutch during each revolution, indicating means, the position of which is determined by said setting means, and a clutch for holding said indicating means in position, said dog releasing said last-named clutch during each revolution thereof.

6. In a speedometer, in combination, a revolving cam, means for revolving said cam, a flipper following said cam to be moved in one direction, resilient means for moving said flipper in the other direction, a dog carried by said cam and having an active and an inactive position, spring means acting against said dog, detent mechanism adapted to be actuated by said flipper, the drop of said flipper serving to engage said detent mechanism to shift said dog from its active to its inactive position, and a setting piece advanced by said dog in its active position.

7. In a speedometer, in combination, a revolving cam, means for revolving said cam, a flipper following said cam to be moved in one direction, resilient means for moving said flipper in the other direction, a dog carried by said cam and having an active and an inactive position, spring means acting against said dog, detent mechanism adapted to be actuated by said flipper, the drop of said flipper serving to engage said detent mechanism to shift said dog from its active to its inactive position, a setting piece advanced by said dog in its active position, and indicating means, the position of which is determined by said setting piece.

8. In a speedometer, in combination, a rotatable body, a cam carried by said body, a pivoted member of considerable weight having a part following said cam, a resilient agent for maintaining said member in contact with said cam, means for adjusting the tension of said resilient agent, a dog carried by said cam, a plunger axially mounted in said body and normally acting as a detent to lock said dog to said cam in its active position, spring means acting against said dog, when released passing to an inactive position, a bell crank lever connected with said plunger and arranged for engagement by a part on said member to release the dog, a setting piece arranged to be advanced by said dog when it is locked to the cam, a spring, a clutch for holding the setting piece so advanced against the tension of said spring, a second spring, indicating mechanism conforming to the position of said setting piece by the action of said second-named spring, and a clutch for holding said indicating mechanism in position, said dog serving to open said clutches in each revolution.

9. In a speedometer, in combination, a revolving cam, a flipper following said cam to be moved in one direction, a resilient agent for moving said flipper in the other direction, and a stronger resilient agent which comes into action only when said flipper is near the limit of its movement in the first-named direction, said last-named agent serving to impart an initial impulse to said flipper in the said other direction.

10. In a speedometer, in combination, a revolving cam, a flipper following said cam to be moved in one direction, a resilient agent for moving said flipper in the other direction, a stronger resilient agent which comes into action only when said flipper is near the limit of its movement in the first-named direction, said last-named agent serving to impart an initial impulse to said flipper in the said other direction, and adjustable means for limiting the range of action of said stronger agent.

11. In a speedometer, a constant time element, a variable element, a setting piece advanced by said variable element, said constant time element determining the length of time of such advancement, a metallic indicator hand mechanically associated with said setting piece, a metallic plate associated with said hand, and an electric sparking circuit including said hand and plate as spark-gap terminals.

In witness whereof, I hereunto subscribe my name this 8th day of April, 1911.

ARTHUR F. POOLE.

Witnesses:
ARTHUR H. BOETTCHER,
ALBERT G. McCALEB,
LEONARD E. BOGUE.